United States Patent

[11] 3,562,554

[72] Inventor John L. Von Feldt
Rochester, Minn.
[21] Appl. No. 697,711
[22] Filed Jan. 15, 1968
[45] Patented Feb. 9, 1971
[73] Assignee International Business Machines Corporation
Armonk, N.Y.
a corporation of New York

[54] BI-POLAR SENSE AMPLIFIER WITH NOISE REJECTION
9 Claims, 2 Drawing Figs.

[52] U.S. Cl. .......... 307/236, 307/254, 307/243
[51] Int. Cl. .......... H03k 5/20
[50] Field of Search .......... 307/254, 242, 243, 236, 241

[56] References Cited

UNITED STATES PATENTS

| | | | |
|---|---|---|---|
| 2,840,726 | 6/1958 | Hamilton | 307/254 |
| 3,007,056 | 10/1961 | Logue et al. | 307/243 |
| 3,219,839 | 11/1965 | Fletcher | 307/236 |
| 3,280,348 | 10/1966 | Jensen | 307/244 |
| 3,382,377 | 5/1968 | Huffman et al. | 307/241 |
| 3,413,492 | 11/1968 | Schneider | 307/236 |

*Primary Examiner*—Donald D. Forrer
*Assistant Examiner*—Harold A. Dixson
*Attorney*—Sughrue, Rothwell, Mion, Zinn and Mac Peak

ABSTRACT: A circuit for amplifying bipolar sense signals which exceed a predetermined threshold level and rejecting noise signals below the threshold level. A pair of transistors of the same conductivity type are connected in a common base configuration. Both transistors are biased into saturation. The degree of saturation is determined by the ratio of collector and emitter bias currents. The emitters of the transistors are connected to the sense line of a magnetic core memory. A sense signal below the predetermined threshold level will not drive either transistor out of saturation. A sense signal above the threshold level will drive one of the transistors out of saturation to produce an output signal in the form of a voltage increase on the collector of that transistor. The other transistor will be driven further into saturation and will not produce an output signal. The noise rejection level of the circuit is the minimum level of a sense signal required to drive a transistor out of saturation. Once a transistor is taken out of saturation and into the active region, it acts as a high gain voltage amplifier.

INVENTOR
JOHN L. VON FELDT
BY Sughrue, Rothwell, Mion, Zinn + Macpeak
ATTORNEYS

BI-POLAR SENSE AMPLIFIER WITH NOISE REJECTION

BACKGROUND OF THE INVENTION

1. Field of the Invention

This invention relates to the field of transistorized bipolar sense amplifiers with noise rejection.

2. Description of the Prior Art

In the prior art, sense signal amplification and discrimination required two stages: a class A transistor amplifier stage followed by a saturated transistor stage which acted as a noise discriminator for the output of the amplifier stage. The signals were applied to the base electrodes of the transistors, and the transistors of the two stages were of opposite conductivity types.

SUMMARY OF THE INVENTION

The broad object of the invention is to provide an improved bipolar sense amplifier and discriminator circuit which comprises a single stage consisting of a pair of transistors connected in a common base configuration. Both transistors are biased into saturation. A sense signal is applied to the inputs of both transistors. Sense signals below a predetermined threshold value will not drive either transistor out of saturation. A sense signal above the predetermined threshold value will drive one of the transistors out of saturation and the other transistor further into saturation. The transistor driven out of saturation produces an output signal in response to the input sense signal.

DESCRIPTION OF THE PREFERRED EMBODIMENT

Figure 1:
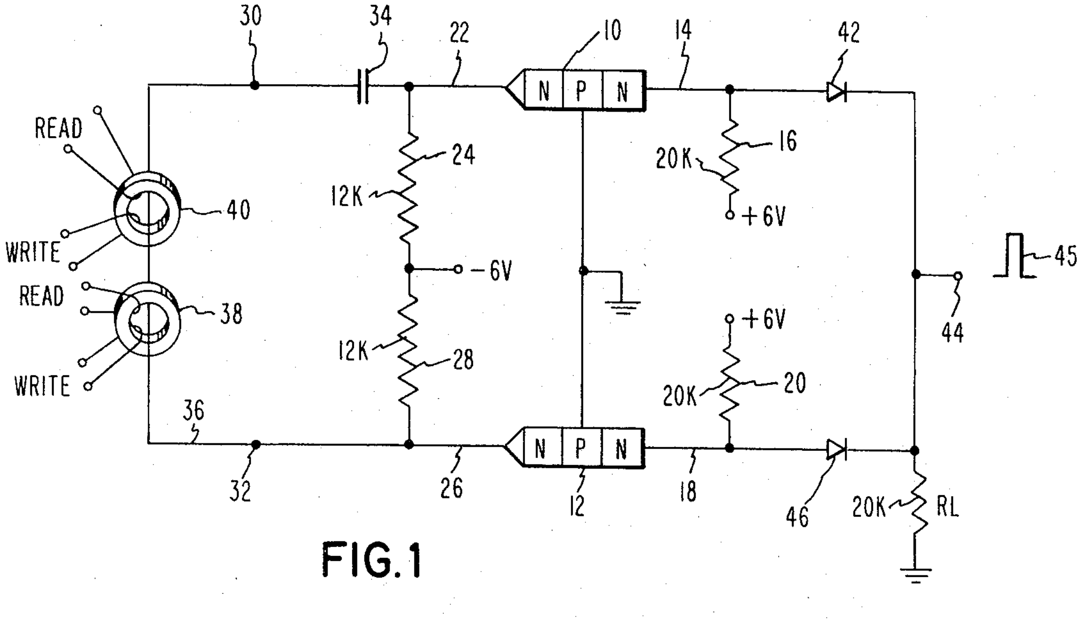
FIG. 1 is a schematic diagram of a preferred embodiment of the invention.

A preferred embodiment of the invention is illustrated in FIG. 1. The improved bipolar sense amplifier and discriminator circuit consists of a pair of NPN transistors 10 and 12 whose base electrodes are connected together and to ground. The collector lead 14 is connected through a bias resistor 16 to a source of positive bias potential +V of +6 volts. In like manner, the collector lead 18 of transistor 12 is connected through a bias resistor 20 to the same source of positive bias potential +V. The emitter lead 22 of transistor 10 is connected through a bias resistor 24 to a source of negative bias potential −V of −6 volts. In like manner, the emitter lead 26 of transistor 12 is connected through a bias resistor 28 to the same source of negative bias potential −V. Capacitor 34 has one plate connected to the emitter of transistor 10 and its other plate connected to the emitter of transistor 12 via sense line 36. Capacitor 34 provides DC isolation between the emitters of transistors 10 and 12. Capacitor 34 also functions to couple AC signals to the emitter of transistor 10.

Since the sense amplifier and discriminator circuit is particularly suited for use as a detector for a memory core sense line, a sense line 36 is shown passing through two magnetic memory cores 38 and 40 and connected across the input terminals 30 and 32.

Collector lead 14 is connected through a semiconductor diode 42 to the output terminal 44 of the improved sense amplifier and discriminator circuit. In like manner, the collector lead 18 of transistor 12 is connected through a semiconductor diode 46 to output terminal 44. Output terminal 44 may be connected to utilization circuit, such as a transistorized current amplifier and latch circuit (not shown).

The sense line of a magnetic core memory detects changes in state of a magnetic core threaded by the sense line. In a typical memory arrangement, any change of state of a core indicates a binary 1 and the lack of change of state indicates a binary 0 with respect to a particular clock or strobe time. However, the sense line may have induced therein noise signals from other currents flowing within the drive lines of the memory. It is desirable to discriminate against such noise signals so that a binary 1 sense signal is detected only upon a change of state of the core associated with the sense line.

Sense line 36 has a resistance of 10 ohms or less. In this particular example, the sense signal produced in line 36 by a change of state of one of the cores 38 or 40 has a value of approximately 60 to 90 millivolts for 350 nanoseconds. Noise signals induced in the sense line may range from 20 to 30 millivolts. The improved bipolar amplifier and discriminator circuit is designed to amplify true sense signals to usable logic levels and reject noise signals below a specified threshold level.

The common base configuration of transistors 10 and 12 has a very low input impedance. This configuration has a current gain of less than one but has a very stable threshold. The bias potentials +V and −V drive both of the grounded base transistors into saturation. The degree of saturation is controlled by the ratio of the collector and emitter bias currents of each transistor which in turn are controlled by the values of resistors 16, 20, 24 and 28.

The sense signal induced in sense line 36 is coupled through capacitor 34 to the emitters of the two transistors 10 and 12. The arrangement of transistors 10 and 12 enable the sensing of signals of either polarity. If it is assumed that the polarity of the sense signal is such that terminal 30 is positive with respect to terminal 32, and that the sense signal is sufficiently large to overcome the negative bias applied to lead 22 by the −V potential source, then transistor 10 is driven out of saturation; however, its collector voltage does not change to produce an output pulse 45 until the threshold between saturation and the active region is reached. This threshold establishes the noise rejection level of the circuit. Once transistor 10 begins to operate in its active region, its voltage gain is quite high and depends essentially on the ratio of the load resistance and the internal emitter resistance $r_e$ of the transistor. Transistor 12 is driven more heavily into saturation since its emitter is driven more negative, and very little, if any, voltage change occurs at its collector.

If a sense signal of opposite polarity is generated in sense line 36, then transistor 12 is driven out of saturation to produce the positive voltage pulse 45 on terminal 44. In this case, transistor 10 is driven further into saturation and very little, if any, voltage change occurs at its collector.

Diodes 42 and 46 isolate the collectors of transistors 10 and 12 from each other and form a logical OR circuit with load resistor RL. The output of this logical OR circuit appears at terminal 44. For a sense signal of either polarity above the threshold level of thirty millivolts, an increase in voltage at the collector of transistor 10 or 12 passes through the corresponding isolating diode 42 or 46 and appears as a positive output pulse on output terminal 44.

Figure 2:
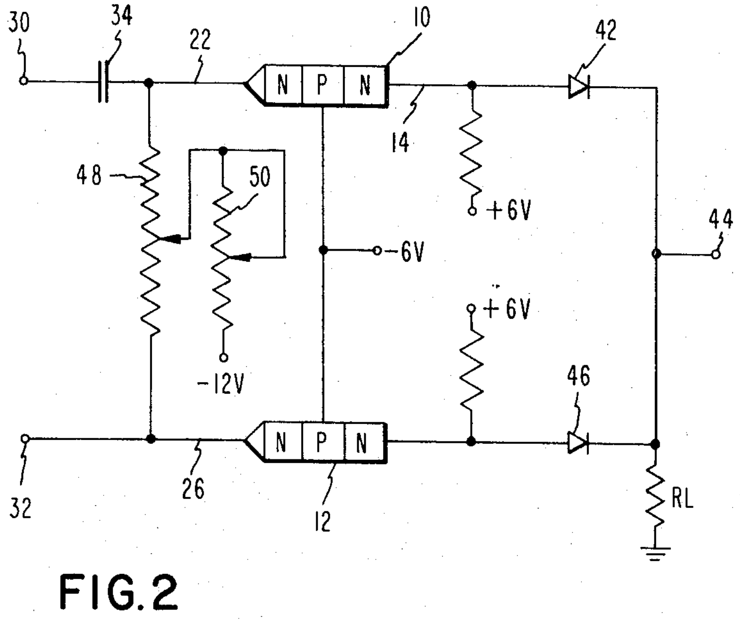
FIG. 2 is a schematic diagram of a modification of FIG. 1.

FIG. 2 shows a slight modification of FIG. 1 in which fixed resistors 24 and 28 are replaced by a pair of potentiometers 48 and 50 which are connected to a negative emitter bias potential of −12 volts. The base electrodes are connected together and to a negative base bias potential of −6 volts. These potentiometers can be adjusted to compensate for differences in base spreading resistance $r_b'$ of the two transistors and to set the noise rejection level. However, with present day technology, fixed resistors of FIG. .1 may be used and selected to provide the degree of saturation required for the necessary noise threshold. This circuit may be designed in either monolithic, hybrid or a discrete form and presents a cost advantage over prior art circuits.

While the invention has been particularly shown and described with reference to preferred embodiments thereof, it will be understood by those skilled in the art that various changes in form and details may be made therein without departing from the spirit and scope of the invention.

I claim:

1. A bipolar sense amplifier and discriminator circuit for producing an output signal in response to an input signal above a predetermined threshold value comprising:

a. first and second transistors each having a base electrode, an input electrode, and an output electrode;
b. means for connecting the base electrodes of said transistors to a common reference potential;
c. a common input circuit connected to the input electrodes of both of said transistors; and
d. means for biasing both of said transistors into saturation so that, when an input signal applied to said input circuit exceeds a predetermined threshold value, one of said transistors is driven out of saturation to produce an output signal and the other of said transistors is driven further into saturation.

2. A bipolar sense amplifier and discriminator circuit as defined in claim 1 further comprising a common output circuit connected to the output electrodes of both of said transistors whereby said output signal is produced in said output circuit.

3. The bipolar sense amplifier and discriminator circuit as defined in claim 2 wherein said common output circuit comprises a logical OR circuit.

4. The bipolar sense amplifier and discriminator circuit of claim 3 wherein said logical OR circuit is a diode-resistor logical OR circuit.

5. A bipolar sense amplifier and discriminator circuit as defined in claim 1 wherein said biasing means comprises means for establishing a potential difference across said input and output electrodes of each of said transistors so that said input electrodes are at one polarity relative to said reference potential and said output electrodes are at the opposite polarity relative to said reference potential.

6. A bipolar sense amplifier and discriminator circuit as defined in claim 5 further comprising means for applying to said common input circuit input signals of opposite polarities relative to said reference potential, whereby said first transistor is driven out of saturation by an input signal of one polarity, and said second transistor is driven out of saturation by an input signal of the opposite polarity.

7. A bipolar sense amplifier and discriminator circuit as defined in claim 1 wherein:
a. said input electrode is an emitter electrode; and
b. said output electrode is a collector electrode.

8. A bipolar sense amplifier and discriminator circuit as defined in claim 1 wherein said transistors are both of the same conductivity type.

9. A bipolar sense amplifier and discriminator circuit as defined in claim 1 wherein said means for applying input signals comprises a low impedance sense line of a magnetic core memory.